United States Patent
Yi et al.

(10) Patent No.: US 11,860,227 B2
(45) Date of Patent: Jan. 2, 2024

(54) MACHINE LEARNING DELAY ESTIMATION FOR EMULATION SYSTEMS

(71) Applicant: Synopsys, Inc., Mountain View, CA (US)

(72) Inventors: Yanhua Yi, Cupertino, CA (US); Yu Yang, Shanghai (CN); Jiajun Fan, Shanghai (CN); Vinod Kumar Nakkala, San Jose, CA (US); Vijay Sundaresan, Milpitas, CA (US); Jianfeng Huang, Shanghai (CN)

(73) Assignee: Synopsys, Inc., Sunnyvale, CA (US)

( * ) Notice: Subject to any disclaimer, the term of this patent is extended or adjusted under 35 U.S.C. 154(b) by 0 days.

(21) Appl. No.: 17/548,317

(22) Filed: Dec. 10, 2021

(65) Prior Publication Data

US 2022/0187367 A1 Jun. 16, 2022

Related U.S. Application Data

(60) Provisional application No. 63/124,332, filed on Dec. 11, 2020.

(51) Int. Cl.
*G06F 9/455* (2018.01)
*G01R 31/3183* (2006.01)
*G06F 30/3308* (2020.01)
*G06F 11/26* (2006.01)

(52) U.S. Cl.
CPC ........ *G01R 31/318321* (2013.01); *G01R 31/318328* (2013.01); *G01R 31/318357* (2013.01); *G06F 11/261* (2013.01); *G06F 30/3308* (2020.01)

(58) Field of Classification Search
USPC .......................... 716/106, 108, 113
See application file for complete search history.

(56) References Cited

U.S. PATENT DOCUMENTS

5,452,239 A * 9/1995 Dai .................. G06F 30/34
716/108
7,051,312 B1 5/2006 Rahut et al.
(Continued)

FOREIGN PATENT DOCUMENTS

JP H07168877 A * 7/1995
WO WO 2017/176786 A1 10/2017

OTHER PUBLICATIONS

Agnesina, A. et al. "Improving FPGA-Based Logic Emulation Systems through Machine Learning." ACM Transactions on Design Automation of Electronic Systems, vol. 25, No. 5, Jul. 2020, pp. 1-20.

(Continued)

*Primary Examiner* — Brian Ngo
(74) *Attorney, Agent, or Firm* — Fenwick & West LLP

(57) ABSTRACT

A delay estimation system estimates a delay of a DUT for an emulation system. The delay estimation system receives logic blocks of the DUT and a combinatorial path connecting one or more of the logic blocks. The system applies a delay model to a feature vector representing the combinatorial path, where the delay model can determine a delay of the combinatorial path. The delay model may be a machine learning model. The system generates a timing graph using the determined delay and provides the timing graph to a compiler to perform placement and routing of the DUT.

20 Claims, 10 Drawing Sheets

(56) References Cited

U.S. PATENT DOCUMENTS

| | | | | |
|---|---|---|---|---|
| 7,133,819 | B1* | 11/2006 | Hutton | G06F 30/392 |
| | | | | 703/19 |
| 7,437,697 | B2 | 10/2008 | Venkateswaran et al. | |
| 8,601,420 | B1* | 12/2013 | Keller | G06F 30/00 |
| | | | | 716/108 |
| 2007/0147229 | A1* | 6/2007 | Geile | H04H 20/79 |
| | | | | 370/480 |
| 2007/0277134 | A1* | 11/2007 | Zhang | G06F 30/3323 |
| | | | | 716/113 |

OTHER PUBLICATIONS

Barboza, E. C. et al. "Machine Learning-Based Pre-Routing Timing Prediction with Reduced Pessimism." 56th ACM/IEEE Design Automation Conference (DAC), Jun. 2-6, 2019, pp. 1-6.
Cheng, H. et al. "Fast and Accurate Wire Timing Estimation on Tree and Non-Tree Net Structures." 57th ACM/IEEE Design Automation Conference (DAC), Jul. 20-24, 2020, pp. 1-6.
PCT International Search Report and Written Opinion, PCT Application No. PCT/US2021/062937, dated Mar. 15, 2022, 18 pages.
Vercruyce, D. et al. "Liquid: High Quality Scalable Placement for Large Heterogeneous FPGAs." International Conference on Field Programmable Technology (ICFPT), Dec. 11-13, 2017, pp. 17-24.

* cited by examiner

MACHINE LEARNING DELAY ESTIMATION FOR EMULATION SYSTEMS

RELATED APPLICATION

This application claims priority under 35 U.S.C. § 119(e) to U.S. Provisional Patent Application Ser. No. 63/124,332, "Integrating Machine Learning Delay Estimation In FPGA-Based Emulation Systems," filed Dec. 11, 2020. The subject matter of the foregoing is incorporated herein by reference in its entirety.

TECHNICAL FIELD

The present disclosure relates to emulating a design under test (DUT) using field programmable gate arrays (FPGAs) and in particular, to determining behavioral aspects of combinatorial paths of the DUT when compiling the DUT for emulation.

BACKGROUND

Delays of combinatorial paths of a DUT can be used to guide the compilation of the DUT. For example, a compiler may determine a particular placement and routing (P&R) of wiring between FPGAs or wiring within an FPGA to reduce the delay of an initial P&R configuration for the wiring. Often, the true delay of a combinatorial path is known only after the compiler finishes compiling the DUT. A conventional solution may be to use a single delay estimate for all combinatorial paths. However, this estimation method often results in a delay that too large or too small, causing compilers to overlook true, critical delays in a compiled DUT. This results in a slowdown in emulation and the expense of processing resources at a compiler that were wasted on incorrectly determined delays.

SUMMARY

A delay estimation system estimates a delay of a DUT for an emulation system. For example, before the DUT is emulated by the emulation system, the delay estimation system estimates the delay of a combinatorial path of the DUT during compilation of the DUT and before emulation. The delay estimation system receives logic blocks of the DUT and a combinatorial path connecting one or more of the logic blocks. The system applies a delay model to a feature vector representing the combinatorial path, where the delay model can determine a delay of the combinatorial path. The system generates a timing graph using the determined delay and provides the timing graph to a compiler to perform placement and routing of the DUT.

The delay estimation system may train the delay model by generating a training data set using combinatorial paths of compiled DUTs and the measured delays of those combinatorial paths. The system then trains the delay model using the generated training set. The delay estimation system can retrain the delay model by receiving a measured delay of the combinatorial path for which it previously determined a delay using the delay model (e.g., receiving the measured delay after the DUT was compiled) and retraining the delay model using another training data set that is generated using the combinatorial path and the received, measured delay. To retrain the delay model using the other training data set, the delay estimation system may adjust weights applied to dimensions of feature vectors input into the delay estimation model. The system may generate the other training data set using the adjusted weights, the combinatorial path, and the measured delay.

The delay estimation system can generate the feature vector to which the delay model is applied. The feature vector may be generated using at least one of a number of logic levels on the combinatorial path, a total hierarchical distance of wires on the combinatorial path, a sum of fanouts of the wires on the combinatorial path, a timing path type of the combinatorial path, a register primitive fill rate of FPGAs through which the combinatorial path spans, and a look-up-table (LUT) primitive fill rate of the FPGAs.

The delay estimation system enables the determination of a critical path using the estimated delay. In one example, one combinatorial path spans a number of FPGAs (e.g., three FPGAs) and has a delay determined by the delay estimation system and another combinatorial path spans another number of FPGAs (e.g., two FPGAs) and has a delay also determined by the delay estimation system. The delay estimation system can determine that the delay of the combinatorial path spanning two FPGAs is greater than the delay of the combinatorial path spanning three FPGAs and in response, determine that the combinatorial path spanning two FPGAs is a critical path while the other is not. The compiler can then allocate a time-division multiplexing (TDM) ratio to the critical path that is greater than the TDM ratio allocated to the combinatorial path that is not the critical path.

In some embodiments, the delay estimation system may partition the DUT (e.g., partitioning a circuit design of the DUT) across FPGAs and identify one or more of the logic blocks of the circuit design that are connected on the combinatorial path. The delay estimation system may use the generated timing graph or a previously generated timing graph to partition the circuit design (e.g., across the FPGAs). In some embodiments, the delay estimated by the delay estimation system may be a wiring delay of the combinatorial path. To generate the timing graph, the delay estimation system may determine a primitive delay of the combinatorial path and determine a total combinatorial path delay using the determined primitive delay and the estimated wiring delay (e.g., a sum of the primitive and wiring delays). The delay estimation system may then generate a timing graph that includes the total combinatorial path delays for respective combinatorial paths connecting logic blocks of the DUT.

Other aspects include components, devices, systems, improvements, methods, processes, applications, computer readable mediums, and other technologies related to any of the above.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to machine learning delay estimation for emulation systems. The compilation workflow to compile a DUT for emulation can be split into phases including partitioning, placement and routing, and compiling. One or more of these phases can be timing driven. For example, the placement and routing of partitioned FPGAs can be determined based on the timing (e.g., delays) of signals from one register to another. The timing of the signals can be measured after the FPGAs are compiled, and the final emulation frequency performance of the system can be determined when the delays associated with signals communicated in the compiled DUT are available. However, this creates a cross-dependency where delays are needed before they are available.

To solve this cross-dependency, the delay can be estimated. A delay estimation system described herein uses machine learning to predict combinatorial path delay and provide timing guidance during the compilation workflow phases. The delay estimation system receives logic blocks of the DUT and a combinatorial path connecting one or more of the logic blocks. For example, after the partitioning phase performed by a compiler, the delay estimation system may receive a combinatorial path connecting two or more logic blocks as partitioned by a compiler across one or more FPGAs. The system applies a delay model to a feature vector representing the combinatorial path, where the delay model can determine a delay of the combinatorial path. The features of the feature vector may be orthogonal to one another, a value of one feature not dependent on the value of another feature. The delay model may be a machine learning model. The system generates a timing graph using the determined delay and provides the timing graph to a compiler to perform compilation workflow phases (e.g., placement and routing of the DUT).

This machine learning approach allows for an increased accuracy with which a delay of a combinational path within a DUT is estimated, an increased speed at which a DUT is emulated due to compiler partitioning and P&R that are both improved as the accuracy of delays increases (i.e., decreasing the processing cycles needed by an emulator when emulating the compiled the DUT), and a reduced consumption of processing resources to estimate a delay of a combinational path within the DUT.

Figure 1:
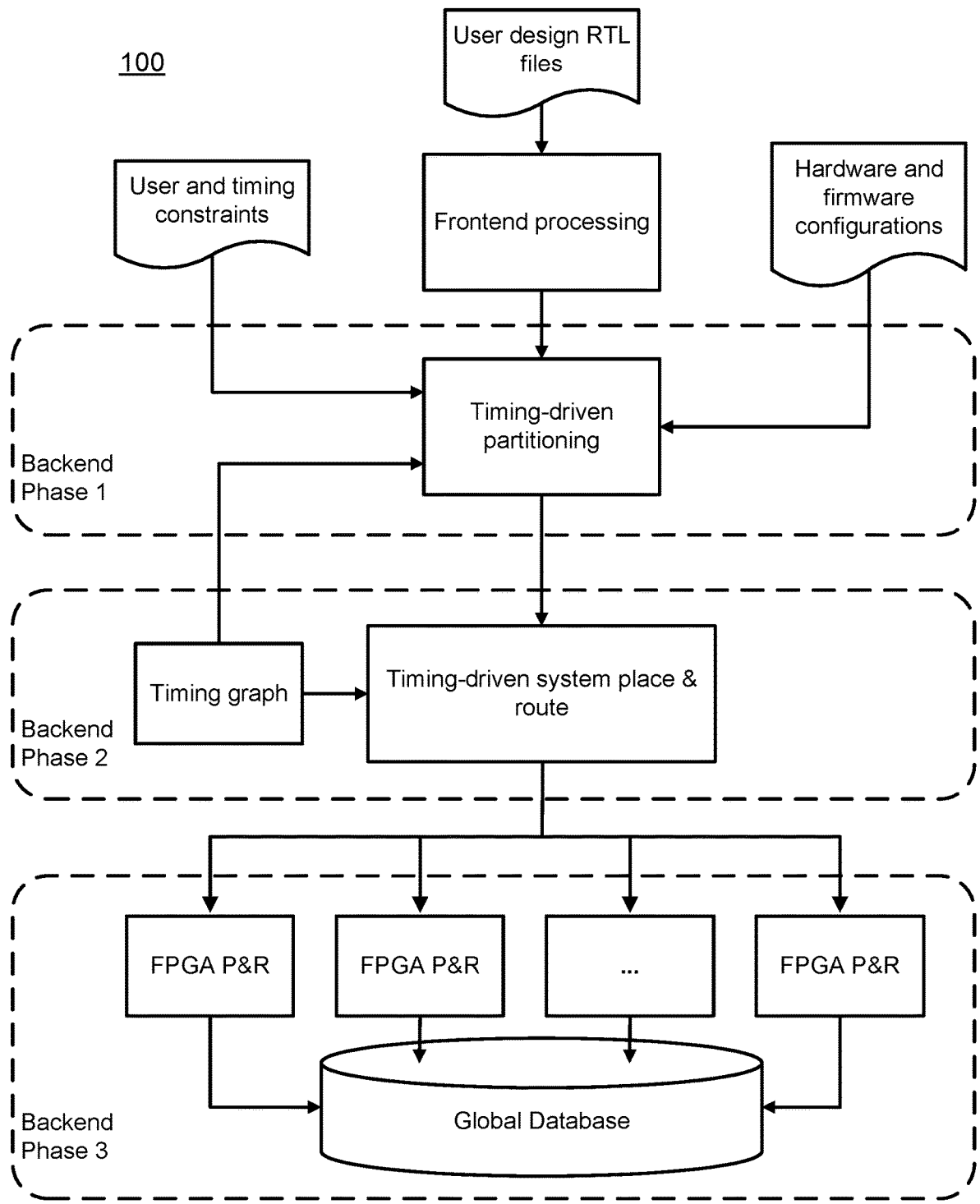
FIG. 1 illustrates a block diagram of a process for compiling a DUT, according to one embodiment.
Figure 9:
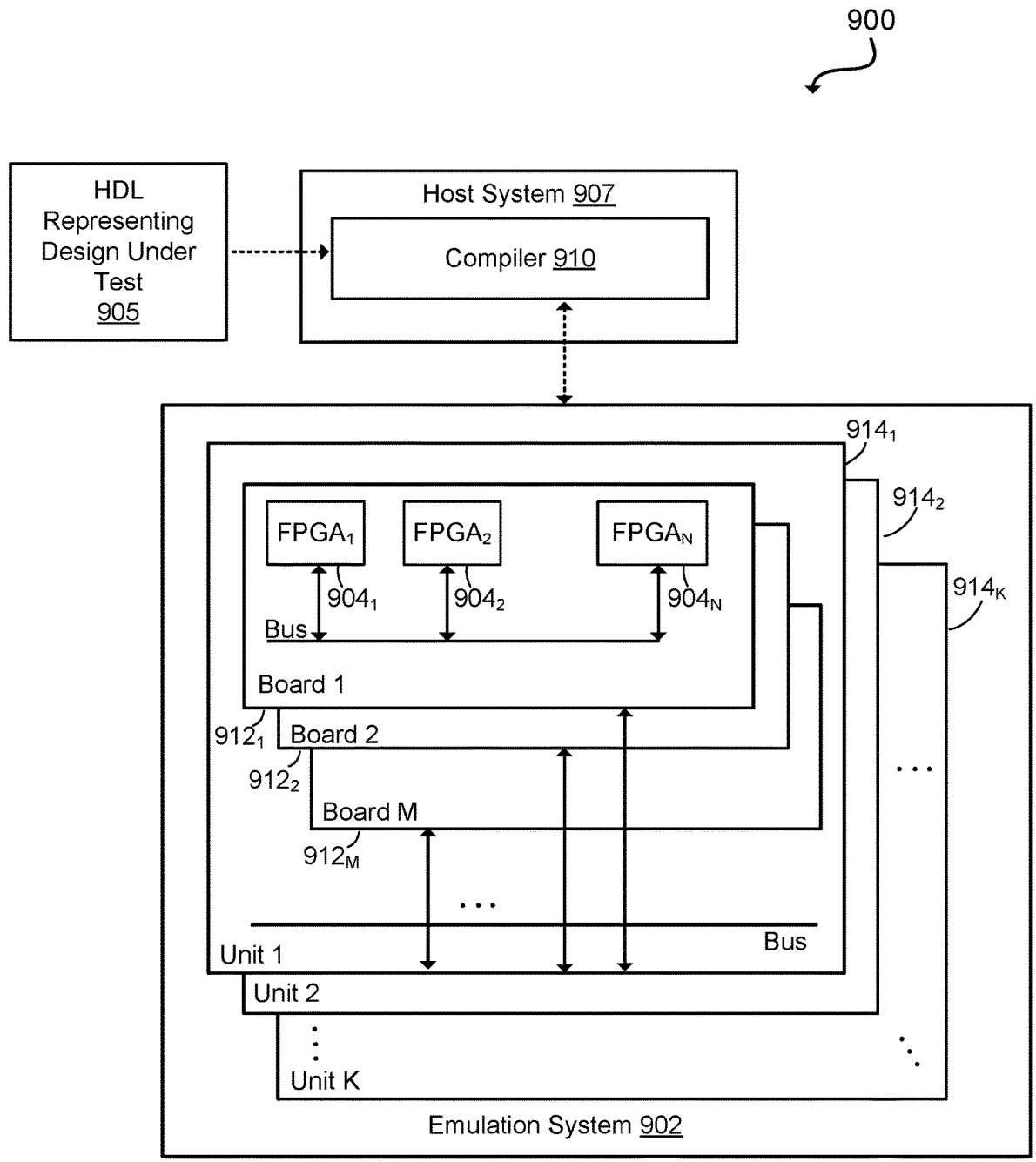
FIG. 9 depicts a diagram of an example emulation system in accordance with some embodiments of the present disclosure.

FIG. 1 illustrates a block diagram of a process 100 for compiling a DUT, according to one embodiment. The process 100 may include both frontend and backend compilation workflows for compiling a DUT. At least a portion of the compilation workflows may be performed by a delay estimation system described herein or a host system (e.g., a compiler of a host system as shown in FIG. 9). The delay estimation system may be a component of the host system. The delay estimation system is further described in the description of FIG. 3.

The backend compilation workflow may be split into three phases. In a first backend phase, a user design is split into multiple subsets of netlists, where each netlist can be mapped and fit into the size of the target FPGA. As the user design, which is also referred to herein as a "design under test" or "DUT," is split across subsets of netlists, the DUT is partitioned across various FPGAs. The first backend phase may be a "partitioning" phase. The first backend phase may be timing-driven (e.g., estimated delays of combinatorial paths of the DUT are used to determine how the DUT is partitioned across FPGAs). A user design may be at least a portion of a DUT. The first backend phase may be performed by a timing-driven partitioning system of a compiler. The timing-driven partitioning system may receive user and timing constraints, hardware and firmware configurations, and the result of the frontend processing phase that is generated using register-transfer level (RTL) files of a user design (e.g., netlists of a DUT). The timing-driven partitioning system may receive delay estimates within a timing graph to determine how the DUT is partitioned across FPGAs. The partitioned DUT is used in a second backend phase.

In a second backend phase, each subset of netlists are placed to a specific physical FPGA location and connections are routed among the FPGAs. The second backend phase may be a "place and route" (P&R) phase. The second backend phase may be timing-driven (e.g., estimated delays of combinatorial paths of the DUT are used in the P&R among the FPGAs). The second backend phase may follow the first backend phase and precede a third backend phase. The second backend phase may be performed by a timing-driven system P&R system of a compiler. The timing-driven system P&R system may receive the partitioned DUT from the first backend phase and delay estimates within a timing graph to determine how FPGAs are placed and routed amongst each other.

In a third backend phase, the partitioned subsets of netlists are sent to a compiler, which compiles the FPGAs (e.g., performing P&R within each of the FPGAs). Additionally, socket logic introduced by the timing-driven system P&R system may be provided to the compiler. The third backend phase may be an "FPGA compile" phase. The third backend phase may also be timing-driven (e.g., estimated delays of combinatorial paths of the DUT are used in the FPGA-level P&R). In some embodiments, after FPGA P&R in the third backend phase is completed, a global timing analysis of the compiled FPGAs may be performed and measured delays of combinatorial paths within the FPGAs may be transmitted to a global database.

In some embodiments of the three-phase backend workflow, the timing graph is generated using the measured delays obtained after the FPGA P&R in the third backend phase is completed. This, however, may create a cross-dependency where the first and second phases cannot use delays in their time-driven operations because the delays are unavailable until the end of the third phase. In some embodiments, to solve the cross-dependency, a fixed delay estimate (e.g., a conservative, fixed delay) or a logic-level-count-based predictor can be used. These solutions, however, may estimate the true delay with low accuracy. In turn, this may mislead backend systems of a compiler to optimize incorrect combinatorial paths of the DUT. For improved accuracy, a delay model may be used to estimate delays using data that is obtained at the first and/or second backend phases. The delay model may be a machine-learning model. The delay model can estimate combinatorial path delay with increased accuracy and improve timing guidance for backend systems of a compiler because the delay model accounts for data specific to the DUT of which delays are estimated. In this way, a delay estimation system implementing the delay model is not limited by the cross-dependency described above, and can perform timing-driven partitioning and P&R before the third backend phase is performed.

Figure 2:
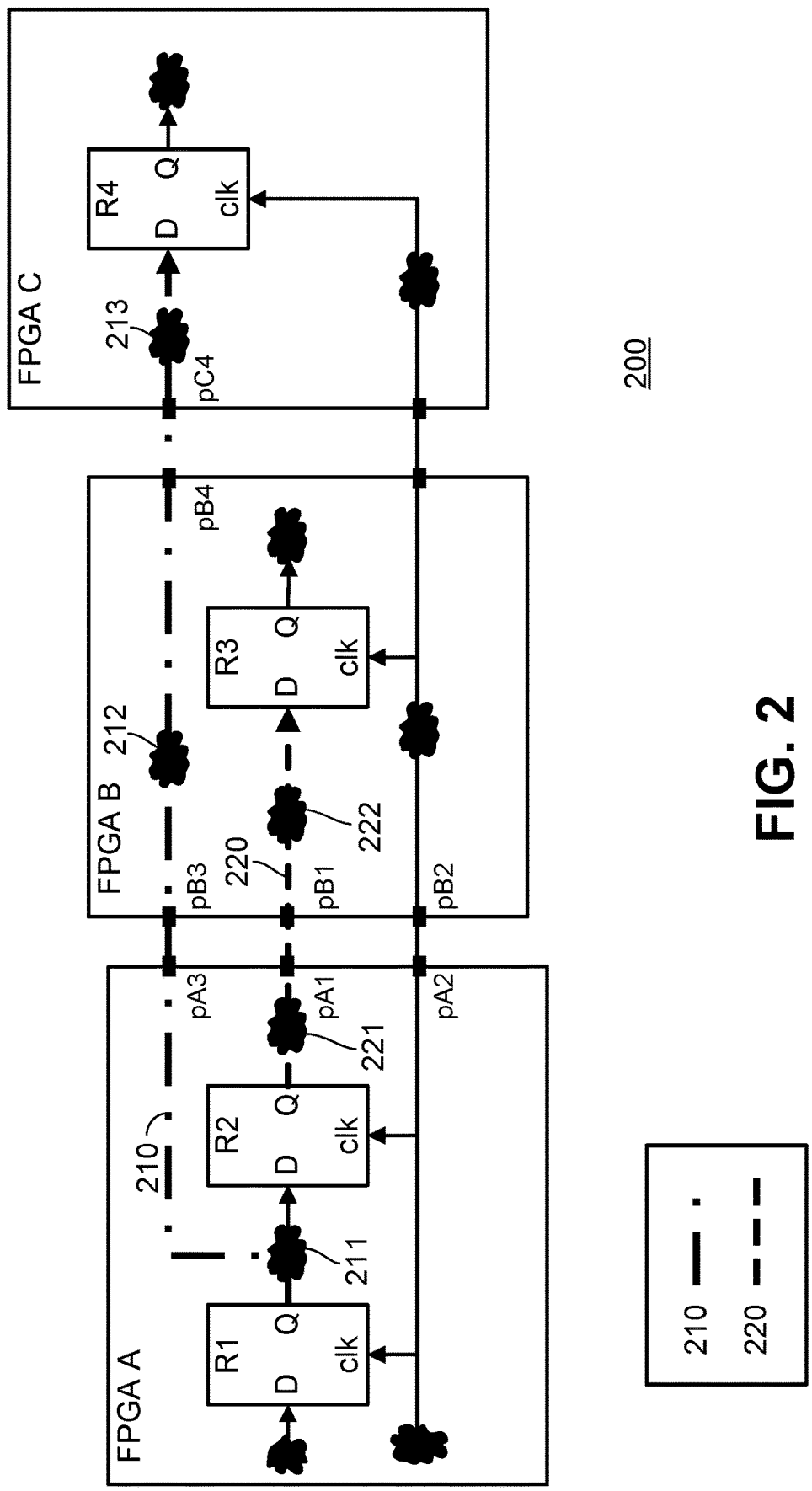
FIG. 2 depicts a DUT partitioned across FPGAs, according to one embodiment.

During partitioning in the first backend phase, the global netlist of the DUT may be split into multiple FPGA-sized clusters, the global timing graph is also spread across different sub-partitions. After partitioning in the first backend phase, the timing nodes that form the global timing graph can be split into different FPGAs. Each timing node may represent a timing path, or timing, arc corresponding to a combinatorial path of the DUT. A timing path may be divided across multiple FPGAs and accordingly, may be divided into multiple timing paths. Examples of paths that are divided across multiple FPGAs are depicted in FIG. 2. The delay of a timing path, both across FPGAs and within an FPGA, can range from a few nanoseconds to hundreds of nanoseconds. The delay may depend on factors such as FPGA size, netlist hierarchy, and FPGA fill rates. An internal FPGA delay is valuable to timing-driven partitioning and/or P&R systems to better optimize performance and size of a DUT through emulation.

By providing a more accurate delay estimate at early backend phases, the delay estimation system allows a compiler to focus on optimizing true critical paths of a DUT rather than incorrectly flagged critical paths whose delays are not as large as the true critical paths' delays. Thus, the delay estimation system may improve DUT emulation (e.g., optimized critical paths causes the speed of emulation to increase) without manual tuning or additional iterations to adjust internal FPGA delays. Furthermore, reducing the frequency at which reperforming emulation is needed due to initial results being low in accuracy also reduces the processing resources consumed by an emulation system. A higher emulation frequency, or emulation clock frequency, enables a faster turnaround in the testing process of user designs, allows more coverage, and lowers cost. For example, coverage can increase because a higher emulation frequency enables more test benches to be run within a given emulation time. Furthermore, some design defects may appear after a long emulation time. With a higher emulation frequency, a cost of time spent finding a design defect can decrease because the higher emulation frequency can reach a clock cycle with a defect faster than with a slower emulation frequency. Yet another way cost is decreased is that an emulation system can be shared by multiple emulation jobs according to a particular job scheduling, and if a job can finish faster, additional jobs can be scheduled. A smaller emulation system can be used to process multiple designs in a scheduling queue; thus, a cost of processing is decreased by using the smaller emulation system that is shared by multiple emulation jobs.

FIG. 2 depicts a DUT 200 partitioned across FPGAs, according to one embodiment. The DUT 200 is partitioned across FPGAs A-C and includes registers R1-R4, logic blocks 211, 212, 213, 221, and 222, and combinatorial paths 210 and 220. The combinatorial path 210 begins at the "Q" output of register R1, which is referred to herein using the notation "R1.Q," and ends at the "D" input of register R1, or R4.D. The combinatorial path 210 includes logic blocks 211, 212, and 213. A logic block may include FPGA primitives (e.g., 4-input LUT ("LUT4"), digital signal processors (DSPs), etc.) and wires, both of which can contribute to the delay of the combinatorial path on which the logic block is connected. The combinatorial path 210 spans across FPGA A and FPGA B at ports pA3 and pB3. The combinatorial path 210 spans across FPGA B and FPGA C at ports pB4 and pC4. The combinatorial path 220 begins at R2.Q and ends at R3.D. The combinatorial path 220 includes logic blocks 221 and 222. The combinatorial path 220 spans across FPGA A and FPGA B at ports pA1 and pB1.

The DUT 200 is partitioned into FPGAs A-C, and thus, a global timing graph of the DUT is also split across multiple FPGAs. Combinatorial paths and the corresponding timing paths can be fully contained within FPGA. For example, the combinatorial path from R1.Q to R2.D is fully contained within FPGA A. Combinatorial paths can be split across multiple FPGAs. For example, the combinatorial path from R2.Q to R3.D is split across FPGAs A and B. In both cases, a delay estimation system can traverse a combinatorial path and obtain logic blocks on the combinatorial path that correlate to the certain timing nodes of the global timing graph. The delay estimation system can extract logic blocks on a combinatorial path and data used to describe the delay on the combinatorial path. Such data can include a number of logic levels on the combinatorial path, a total hierarchical distance of wires on the combinatorial path, a sum of fanouts of the wires on the combinatorial path, a timing path type of the combinatorial path, a register primitive fill rate of one or more field programmable gate arrays (FPGAs) through which the combinatorial path spans, a look-up-table (LUT) primitive fill rate of the FPGAs, any suitable feature relevant to the delay of a primitive or wiring of a logic block, or a combination thereof.

The delay estimation system can use the combinatorial path, extracted logic blocks on the combinatorial path, and extracted data to estimate the timing path delays for a global timing analysis. For example, the combinatorial path 220 from R2.Q to R3.D was split into FPGA A and FPGA B, and the delay estimation system can estimate the delay from R2.Q to pA1 and the delay from pB1 to R3.D separately (e.g., using a delay model). The estimated delay may then be annotated to the global timing graph.

Figure 3:
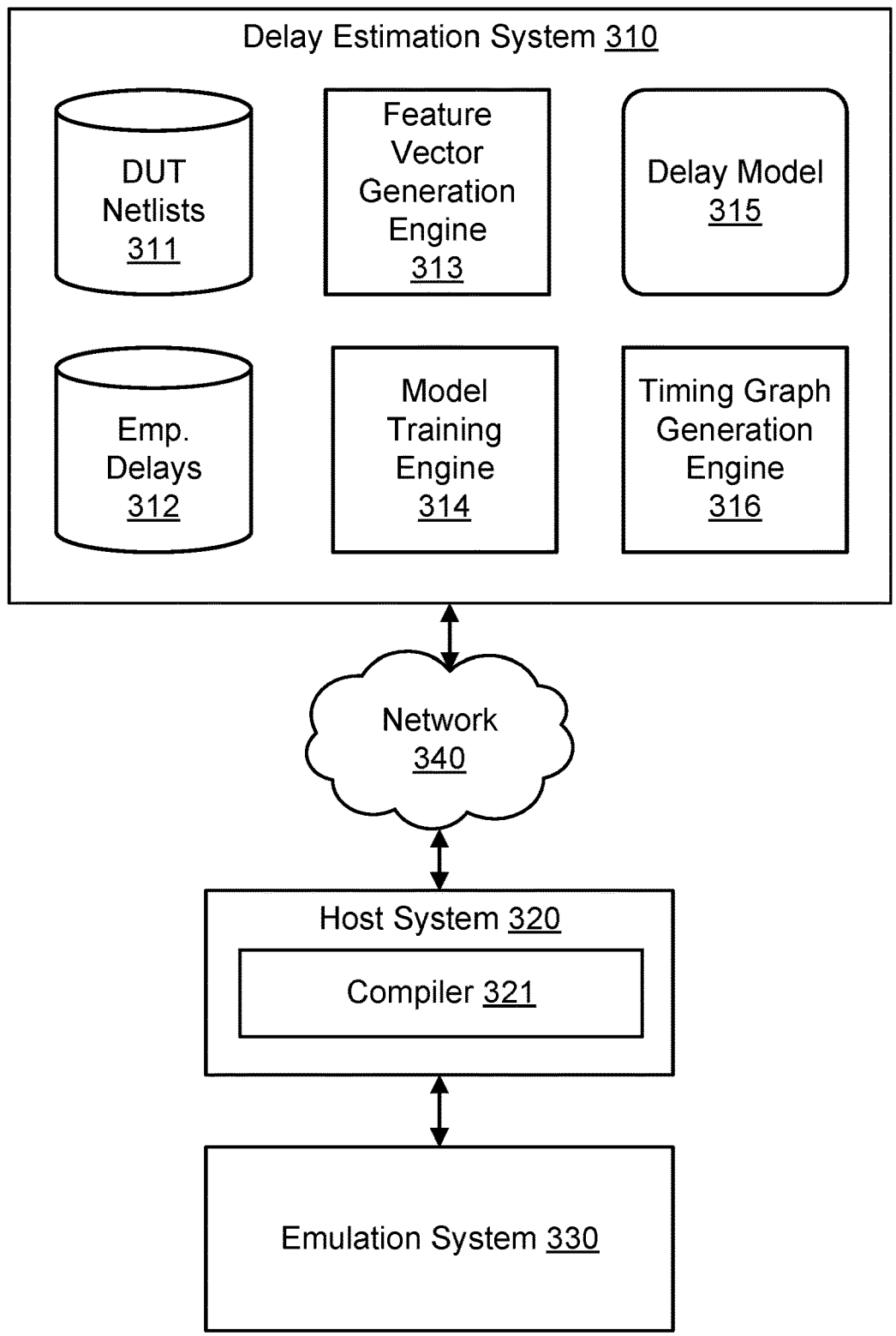
FIG. 3 shows a block diagram of a delay estimation system, according to one embodiment.

FIG. 3 shows a block diagram 300 of a delay estimation system, according to one embodiment. The block diagram 300 includes a delay estimation system 310, a host system 320, an emulation system 330, and a network 340. The delay estimation system 310 may be a remote computing device or server that is communicatively coupled to the host system 320 through the network 340. The host system 320 may be a computing device that includes a compiler 321 for compiling a DUT using a netlist from the DUT netlists database 311. The host system 320 may be communicatively coupled to the emulation system 330 through a local network connection (e.g., as described in the description of FIG. 9). The delay estimation system 310 can include databases such as a DUT netlists database 311 and an empirical delay database 312. Alternatively or additionally, databases can be located remote from the delay estimation system 310 (e.g., in a different server that is communicatively coupled to the delay estimation system 310 and the host system 320 through the network 340). The delay estimation system includes software modules such as a feature vector generation engine 313, a model training engine 314, a delay model 315, and a timing graph generation engine 316. The block diagram 300 may have additional, different, or fewer components than shown in FIG. 3.

It is noted that a software module may comprise executable program code that may be stored in a non-transitory computer readable storage medium (e.g., a storage device such as a disk or memory) and executable by one or more processing units (e.g., a processor, a controller, state machine). The program code may be packaged with the processing unit to provide a special purpose device corresponding to the function described. Further, it is noted that an engine also may be comprised of executable program code that may be stored in a non-transitory computer readable storage medium (e.g., a storage device such as a disk or memory) and executable by one or more processing units (e.g., a processor, a controller, state machine). The program code may be packaged with the processing unit to provide a special purpose device corresponding to the function described.

The DUT netlists database 311 stores netlists of DUTs for compilation by the compiler 321 and emulation by the emulation system 330. The delay estimation system 310 may access the netlists in the database 311 for determining a feature vector via the feature vector generation engine 313, determining training data to train the delay model 315 by the model training engine 314, inputting into the delay model 315 for estimating a delay of a combinatorial path representing a portion of a netlist, or annotating a global timing graph of the netlist via the timing graph generation engine 316. A DUT can be mapped into FPGA primitives during the frontend processing phase (e.g., as shown in FIG. 1). The DUT netlists database 311 may also store data describing the mapped primitives and wires to be provided as input for backend phases or delay estimation by the system 310.

The empirical delay database 312 stores the measured delays after compiling the FPGA(s) into which the DUT is partitioned. These measured delays can be used by the model training engine 314 to train and validate the delay model 315 (e.g., using the primitives and traversed logic blocks along a timing path). Although not depicted, the delay estimation system 310 may include a database for storing estimated delays output by the delay model 315. The stored delays may be in a data structure representing a global timing graph, including a netlist or logic blocks thereof annotated with the estimated delays. The delay estimation system 310 may provide the estimated delays stored in the database 312 to the host system 320 for optimizing partitioning and/or P&R of the DUT during compilation.

The feature vector generation engine 313 generates a feature vector representing data related to a combinatorial path, where the feature vector is input to the delay model 315 for estimating the delay of the combinatorial path. The feature vector generation engine 313 may also generate feature vectors for use as training data by the model training engine 314. The feature vector generation engine 313 may generate vectors representing total primitive delays and total wire routing delays, two components that contribute to the total delay of a combinatorial path. A feature vector may include one or more dimensions, or features, where each dimension is a value representing a characteristic of a combinatorial path related to determining its delay. The characteristics can include the number of logic levels on the combinational path, the hierarchical distance on path, the total fanout, the timing path type, the register primitive fill rate of the FPGA, and the LUT primitive fill rate of the FPGA. The characteristics may be chosen such that the dimensions of the feature vectors are orthogonal (e.g., the values of the dimensions are independent of each other). In one example of a three-dimensional feature vector, the feature vector generation engine 313 generates a feature vector of three values representing the total fanout of wires on a combinatorial path, a register primitive fill rate of one or more of the FPGAs through which the combinatorial path spans, and a number of logic levels on the combinatorial path. The features included in the feature vector generated by the feature vector generation engine 313 may be obtained after a compiler completes a partitioning phase of the DUT (e.g., backend phase 1). The different features that may be included within feature vectors are described in more detail below.

The feature vector generation engine 313 can compute primitive delays based on a sum of delays of each primitive in a combinatorial path. The delay of each primitive can be stable or constant. For example, for primitive such as global clock buffer (BUFG), DSP, or random access memory (RAM), the feature vector generation engine 313 can determine a constant primitive delay given input and output pin ID combination that is known at the partitioning phase. In some embodiments, primitive delay can be estimated (e.g., using an average delay). For example, for a primitive such as a LUT, although the pin ID is known at the portioning phase, the pin IDs may be swapped during a subsequent phase of compilation. Accordingly, a statistical mean value can be used to estimate the primitive delay for the LUT.

The feature vector generation engine 313 can compute wire routing delays in a combinatorial path. In some embodiments, delays of each wire may vary from wire to wire. However, data describing the combinatorial path and capture the factors that impact the total wire delays may be used to estimate the wire delays. As described previously, the data may include (1) a number of logic levels on the combinatorial path, (2) a total hierarchical distance of wires on the combinatorial path, (3) a sum of fanouts of the wires on the combinatorial path, (4) a timing path type of the combinatorial path, (5) a register primitive fill rate of one or more of the FPGAs through which the combinatorial path spans, (6) LUT primitive fill rate of the one or more FPGAs, any suitable data impacting the total wire delay, or combination thereof. The data may be independent of one another. Any two of the six features identified above may be orthogonal to one another (e.g., a total fanout of a combinatorial path does not depend on a timing path type). Because the feature vector can be composed of dimensions that are orthogonal to one another, the delay estimation system 310 increases the processing efficiency at which delay is estimated (e.g., by avoiding the use of processing resources on data that is redundant for determining the delay).

A number of logic levels on the combinatorial path can represent the logic length of a combinatorial path, where each wire or primitive is one logic level. Total fanout of a combinatorial path can represent the fanout nature of wires in the combinatorial path. The total fanout can be the sum of fanouts on all the wires in the combinatorial path. The register primitive fill rate and the LUT primitive fill rate are FPGA usage features, which are indirect indicators of FPGA usage or congestion impact on routing delays. A timing path type of a combinatorial path represents a difference between path types (e.g., indicating that the combinatorial path type is of a clock path type rather than a data path type).

The total hierarchical distance on a path represents the total hierarchical distance of the wires along the combinatorial path. The total hierarchical distance is related to a correlation between a wire driver or load hierarchy and the physical distance in the FPGA placement towards a later stage of the compilation workflow. Specifically, for each wire with a driver-reader pair, the hierarchical distance can be defined as:

$$\text{hier\_dist\_max} = \frac{\text{max\_diff\_hier}}{\text{max\_diff\_hier} + \text{common\_hier}}$$

where max_diff_hier is the maximum different hierarchy number of the driver and load instances and common_hier is the common hierarchy of the driver and load instances.

In one example of determining a total hierarchical distance on a path, one wire connects two instances: a driver instance of "top/a/b/c/d/e" and a reader instance of "top/a/b/c/f/g/h." The common hierarchy is "top/a/b/c" and the different hierarchy is "d/e" and "f/g/h." The common hierarchy of the two instances, common_hier, is 4. The maximum different hierarchy number of the two instances is defined as the larger number among the different hierarchies, which is max(d/e, f/g/h), or 3 in this example. The hier_dist_max as thus 3/(3+4)=3/7. The total hierarchical distance is a sum of the hier_dist_max of each wire on the combinatorial path. Similarly, a minimum hierarchical distance can be a value that is included in addition or alternatively to the maximum hierarchical distance for use in the generated feature vector.

Depending on the design size, type, or partitioning results, the number of timing paths across each FPGA can be large (e.g., ranging from ten thousand to one hundred thousand paths). In an experiment conducted to develop a delay model, 42 designs of various sizes and a total of 2.1 k FPGAs were analyzed, which resulted in about 9.3 million combinatorial paths, each having a corresponding timing path. In this experiment, the 9.3 million combinatorial paths were used to generate a training dataset for the delay model and a random forest algorithm was used to develop the delay model. Weights were determined for each feature in the vector, as shown in Table 1 below.

TABLE 1

Example weights for delay model features

| | Feature | Feature weight |
|---|---|---|
| (1) | num_logic_levels | 0.63 |
| (2) | hier_dist_max_path | 0.3 |
| (3) | total_fanouts | 0.03 |
| (4) | timing_path_type | 0.02 |
| (5) | reg_fill_rate | 0.01 |
| (6) | lut_fill_rate | 0.01 |

Although a random forest algorithm was used to develop the delay model in the experiment, the delay model 315 may use various machine learning techniques such as linear support vector machine (linear SVM), boosting for other algorithms (e.g., AdaBoost), neural networks, logistic regression, naïve Bayes, memory-based learning, bagged trees, decision trees, boosted trees, boosted stumps, a supervised or unsupervised learning algorithm, or any suitable combination thereof.

The model training engine 314 may train the delay model 315 using feature vectors generated by the feature vector generation engine 313 and validate the delay model 315. To train the delay model 315, the model training engine 314 may generate a first training data set using combinatorial paths of compiled DUTs and measured delays of the combinatorial paths. The training data may feature vectors generated using information about the combinatorial path (e.g., including the six features described with respect to the feature vector generation engine 313). The feature vectors may be labeled with the measured delay of the corresponding combinatorial path that is represented by the feature vector. The model training engine 314 may train the delay model 315 using the first training data set. The model training engine 314 may retrain the delay model 315 using a second training data set. The delay estimation system 310 may generate a timing graph generated using the delay model 315 trained using the first training data set, compile a DUT using the timing graph, and subsequently receive a measured delay of a combinatorial path of the compiled DUT. The model training engine 314 may create a second training data set using the combinatorial path and the subsequently received measured delay. In one example of retraining the model 315, the model training engine 314 adjusts weights corresponding to dimensions of feature vectors (e.g., the weights shown in Table 1). The model training engine 314 may generate the second training data set using the adjusted weights and a feature vector of the six features of the combinatorial path, where the feature vector is labeled with the subsequently received measured delay.

In one example of validating the delay model 315, combinatorial paths on half of compiled FPGAs may be used as a training set and the remaining combinatorial paths may be used for validation. A Random Forest algorithm may be used to determine an R2 score and a room mean square error (RMSE) to validate the delay model 315. For example, an R2 score of 91% and an RMSE at 10416 nanoseconds were determined for the delay model whose experimental results are depicted in the FIG. 7.

The delay model 315 outputs a delay caused by a particular configuration of a DUT determined during compilation (e.g., a particular FPGA partition or a particular place and routing of FPGAs). The delay model 315 may output delays for a combinatorial path of the DUT, a logic block on a combinatorial path, or combination thereof. The delay model 315 may output an estimate of a wire delay or an estimate of a total combinatorial path delay. In one example of outputting an estimated wire delay, the delay model 315 can receive, as input, a feature vector representing a combinatorial path, where the feature vector includes the six features described in the description of the feature vector generation engine 313. The delay model 315 may then output an estimated wire delay, as the six features represent a wire delay of the combinatorial path. The estimated wire delay may then be combined with a primitive delay of the combinatorial path to determine a total combinatorial path delay (e.g., for including in a timing graph). In an example of outputting an estimated total combinatorial path delay, the delay model 315 may receive, as input, a feature vector including the six features and a primitive delay of the combinatorial path. Using this example feature vector of seven dimensions, the delay model 315 may output an estimate of the total combinatorial path delay of the combinatorial path.

The timing graph generation engine 316 may generate a timing graph for a DUT. A timing graph may include timing nodes that correspond to components contributing to the delay of a combinatorial path. For example, the timing graph generation engine 316 may receive estimated delays of logic blocks output by the delay model 315 and annotate corresponding timing nodes in the timing graph. In another example, the timing graph generation engine 316 may receive estimated delays of combinatorial paths and annotate timing paths corresponding to one or more timing nodes in a timing graph. The timing graph generation engine 316 may receive logic blocks of a DUT and a combinatorial path connecting one or more of the logic blocks (e.g., from the netlist database 311 or from a compiler). The timing graph generation engine 316 applies the delay model 315 to a feature vector representing the combinatorial path, where the feature vector may be generated by the feature vector generation engine 313). The timing graph generation engine 316 can generate a timing graph based on a delay of the combinatorial path as determined by the delay model 315.

In some embodiments, the delay estimation system 310 determines true critical paths of a DUT. A critical path may be a combinatorial path that has a greater delay than one or more other combinatorial paths of a DUT. Delay that is determined without applying the delay model 315 may be inaccurate and cause critical paths to be incorrectly determined, leaving true critical paths unoptimized because the delay was not flagged to a compiler as needing resources to minimize (e.g., P&R to determine a time division multiplexing (TDM) ratio that would allocate more wires to decrease the delay on the true critical path).

Using FIG. 2 as an example of determining critical paths, a true critical path may be combinatorial path 220 while the combinatorial path 210 may have been incorrectly determined to be a critical path. This may happen if the delay is determined solely based on the number of FPGAs that a combinatorial path traverses. Because the combinatorial path 210 traverses FPGA A-C while the combinatorial path 220 traverses FPGAs A and B, the combinatorial path 210 may be determined to have more delay than the combinatorial path 220. However, taking account attributes of the combinatorial path (e.g., the primitives and wiring delays within logic blocks 211-213, 221, and 222), the delay estimation system 310 may determine that the delay of combinatorial path 220 is greater than the delay of combinatorial path 210. Hence, the true critical path is the combinatorial path 220. The compiler may then use the delays determined by the delay estimation system 310 to allocate TDM ratios accordingly (e.g., a greater TDM ratio to combinatorial path 220 than is allocated to the combinatorial path 210).

The network 340 may serve to communicatively couple the delay estimation system 310 and the host system 320. In some embodiments, the network 340 includes any combination of local area and/or wide area networks, using wired and/or wireless communication systems. The network 340 may use standard communications technologies and/or protocols. For example, the network 340 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 340 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, all or some of the communication links of the network 340 may be encrypted using any suitable technique or techniques.

Figure 4:
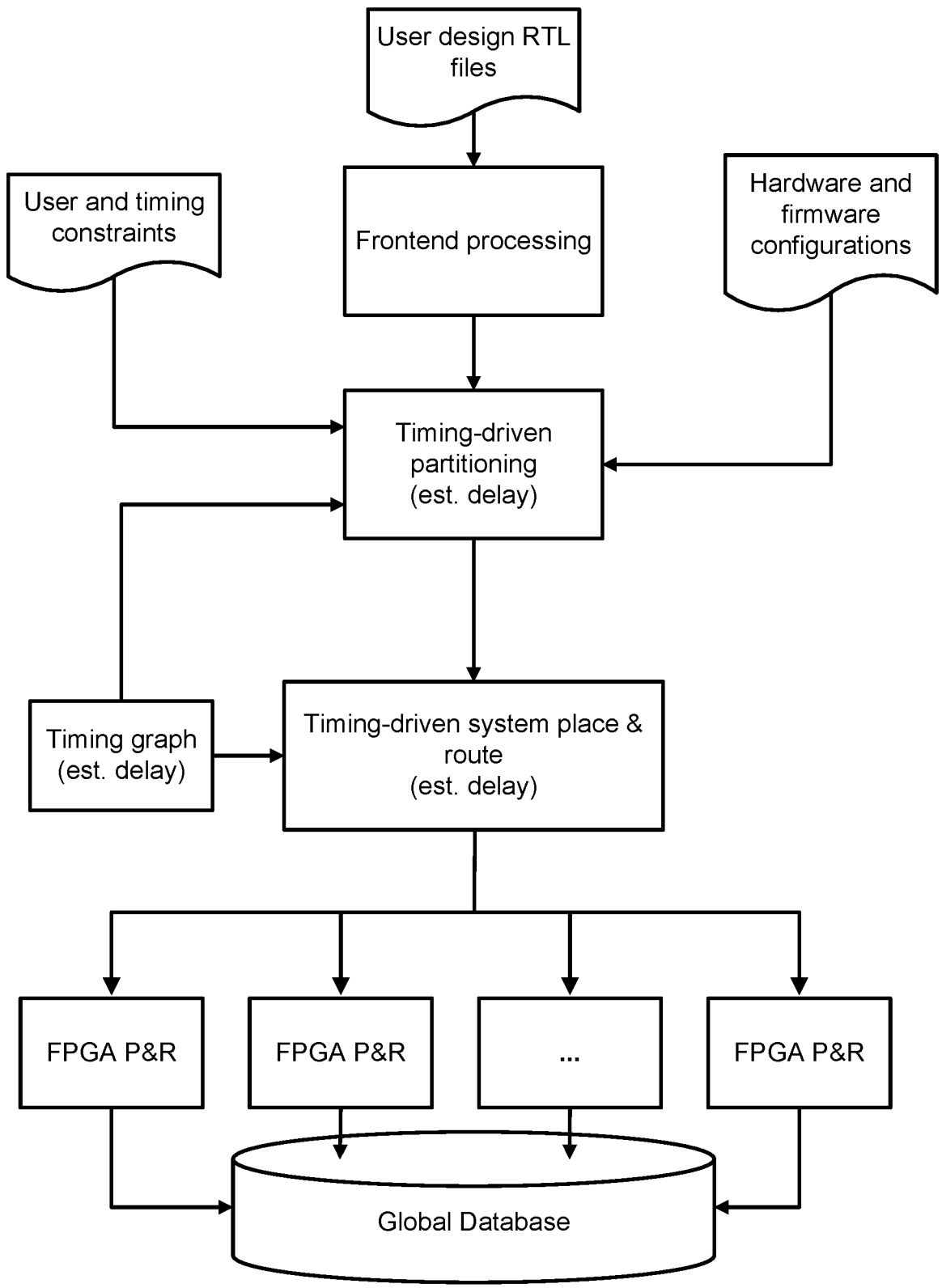
FIG. 4 illustrates a block diagram of a process for compiling a DUT using delay estimates, according to one embodiment.

FIG. 4 illustrates a block diagram of a process 400 for compiling a DUT using delay estimates, according to one embodiment. In some embodiments, the timing graph generation engine 316 may generate a timing graph without a delay model. For example, a fixed delay estimate (e.g., a conservative, fixed delay) or a logic-level-count-based predictor can be used to determine a timing graph for a DUT to be compiled. The estimated delays can be applied to partition a DUT across FPGAs and perform P&R among the FPGAs before performing P&R within the FPGAs.

Figure 5:
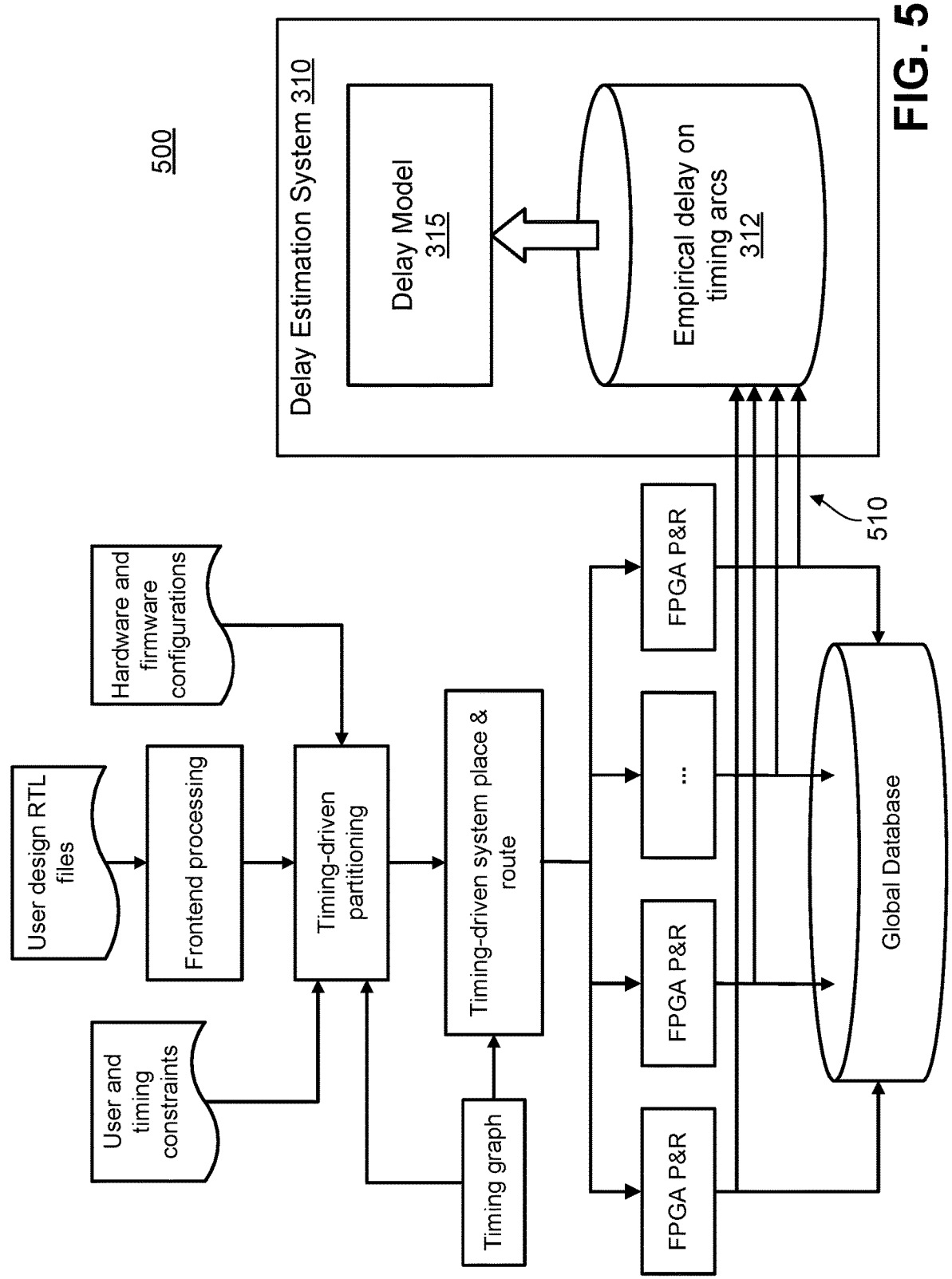
FIG. 5 illustrates a block diagram of a process for training a delay model of a delay estimation system, according to one embodiment.

FIG. 5 illustrates a block diagram of a process 500 for training a delay model of a delay estimation system, according to one embodiment. The process 500 is similar to the process 100 depicted in FIG. 1. The process 500 differs in the addition of empirical delays 510 being provided to the delay estimation system 310. The delay estimation system 310 may receive the empirical delays 510 of combinatorial paths measured after the DUT is compiled across one or more FPGAs. The empirical delays 510 are stored in the empirical delay database 312 of the delay estimation system 310 for use to train the delay model 315. The training of the delay model 315 is described in the description of the model training engine 314 of FIG. 3.

Figure 6:
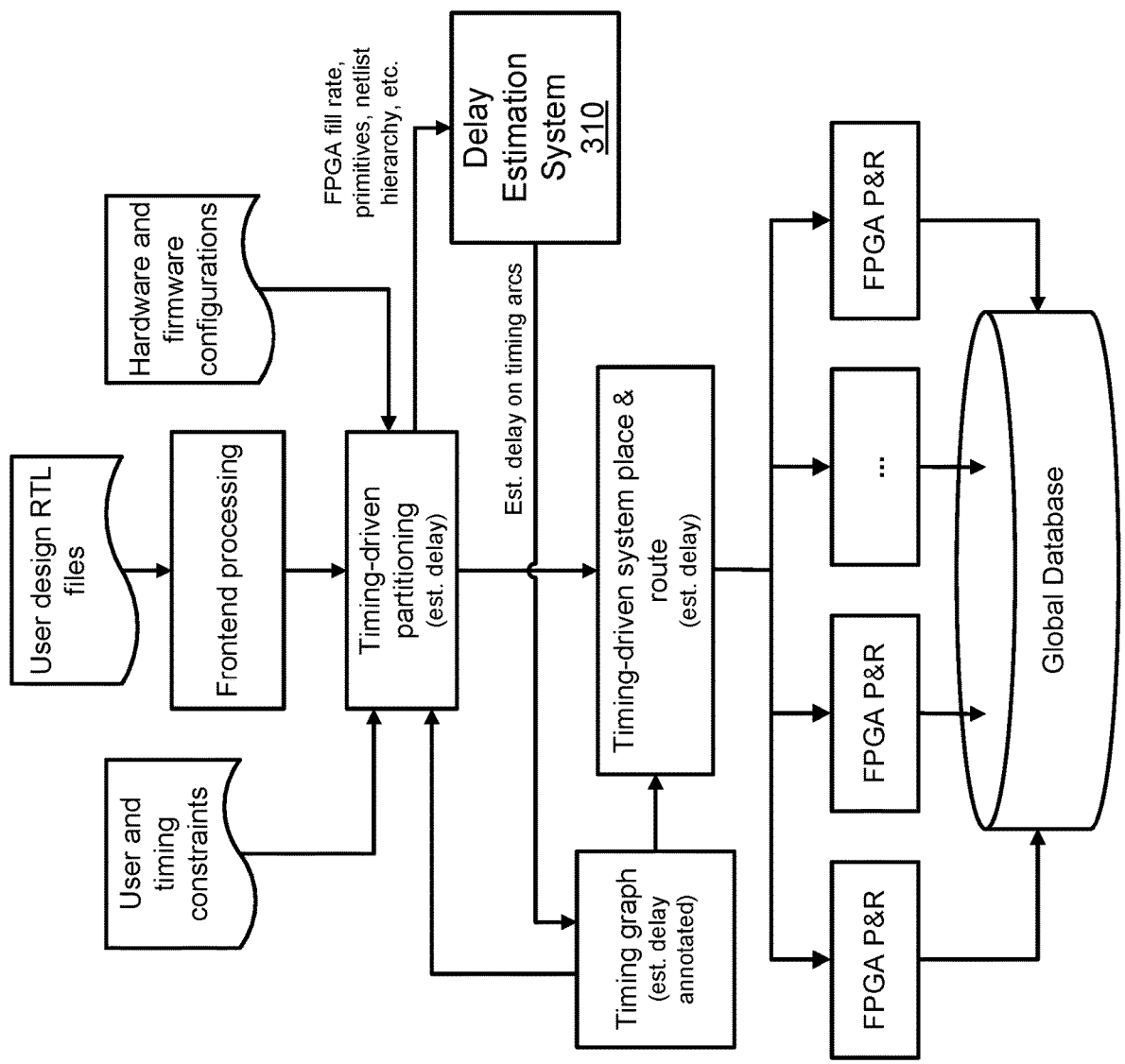
FIG. 6 illustrates a block diagram of a process for compiling a DUT using delay estimates determined by a delay estimation system, according to one embodiment.

FIG. 6 illustrates a block diagram of a process 600 for compiling a DUT using delay estimates determined by the delay estimation system 310, according to one embodiment. The process 600 may occur following the process 500 in which the delay model 315 is trained using the empirical delays 510. In the process 600, the delay model 315 of the delay estimation system 310 is applied to data related to the combinatorial paths of which delay is estimated. The delay estimation system 310 may receive data following the partitioning phase of the backend compilation workflow, where the data includes information related to the logical blocks of a DUT that is partitioned into FPGAs, the FPGA fill rate(s), primitives, netlist hierarchy, any suitable information related to the impact of wire delays (e.g., timing path types, number of logic levels of a combinatorial path, hierarchical distance of a combinatorial path, register fill rate, or LUT fill rate), or a combination thereof. The received data may be used by the feature vector generation engine 313 to generate a feature vector for input to the delay model 315. The delay model 315 outputs an estimated delay for a combinatorial path of the partitioned DUT, where the combinatorial path corresponds to a timing path and thus, the output delay is also the delay for the timing path. The estimated delays may be used to generate a timing graph with the delays annotating timing nodes or paths of the timing graph. The estimated delays of the timing graph can be used to re-partition the DUT among FPGAs to reduce the delays of each of the newly partitioned FPGAs. The estimated delays can be used to perform P&R among the FPGAs to reduce delays caused by connections between FPGAs.

Figure 7:
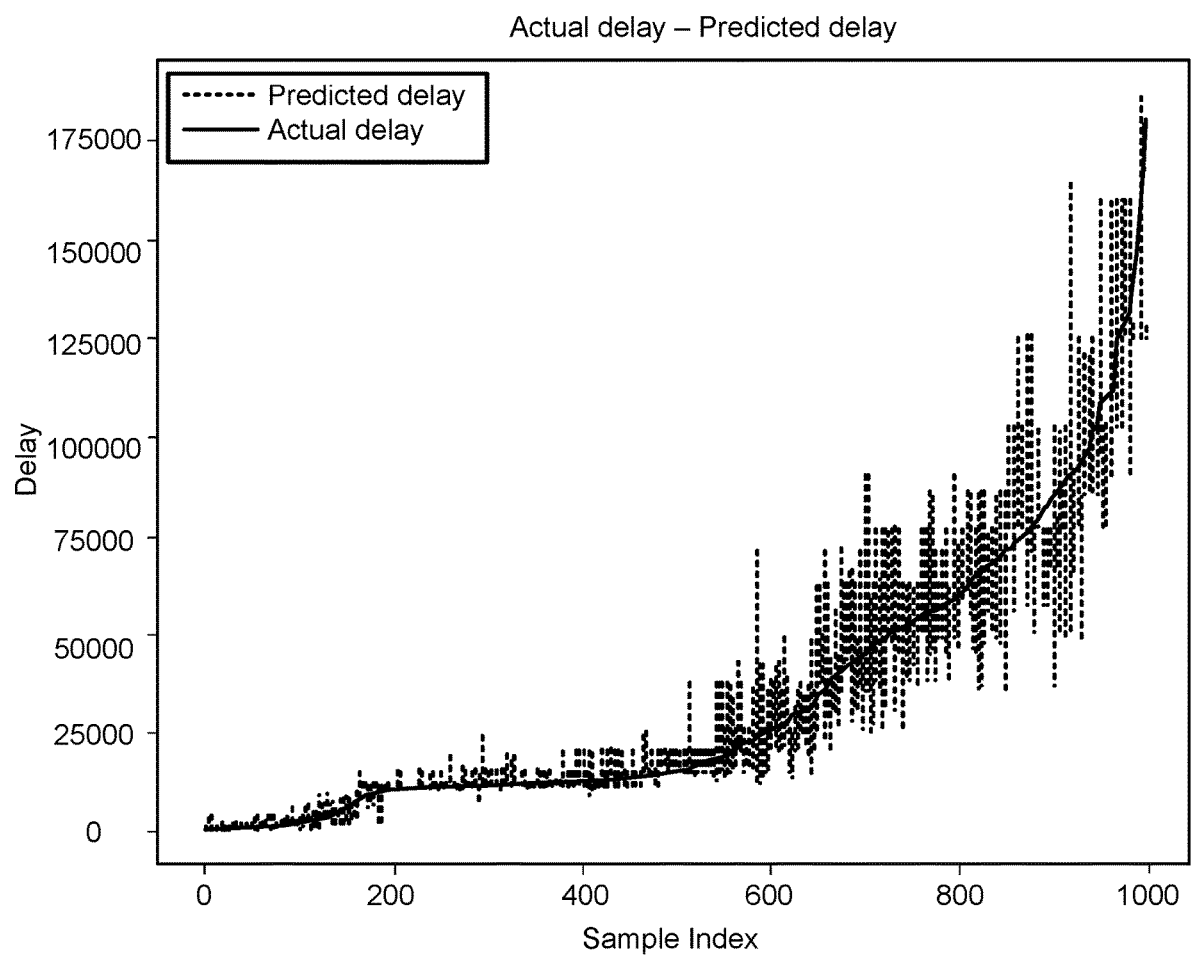
FIG. 7 shows experimental results comparing measured delays of paths of a compiled DUT against estimated delays of the paths using a delay estimation system.

FIG. 7 shows experimental results 700 comparing examples of measured delays of paths of a compiled DUT against estimated delays of the paths using a delay estimation system. Application of the delay model to backend phases of the compilation workflow may improve the performance of the compiled DUT by reducing delays by, for example, 5-20% due to the accuracy of the combinatorial path delays output by the delay model for use in optimizing the partitioning and P&R of the DUT during compilation. Another result of the experiment showed that the DUT emulation frequency reported at the second backend phase was closer to the performance reported after the third backend phase. In particular, the accuracy of the delay model described herein is shown by the experimental results 700. The results 700 show that the range of estimated delay increases as the actual delay increases. However, the estimated delays track the actual delay with an R2 score of 91% and an RMSE of 10416 ns.

Figure 8:
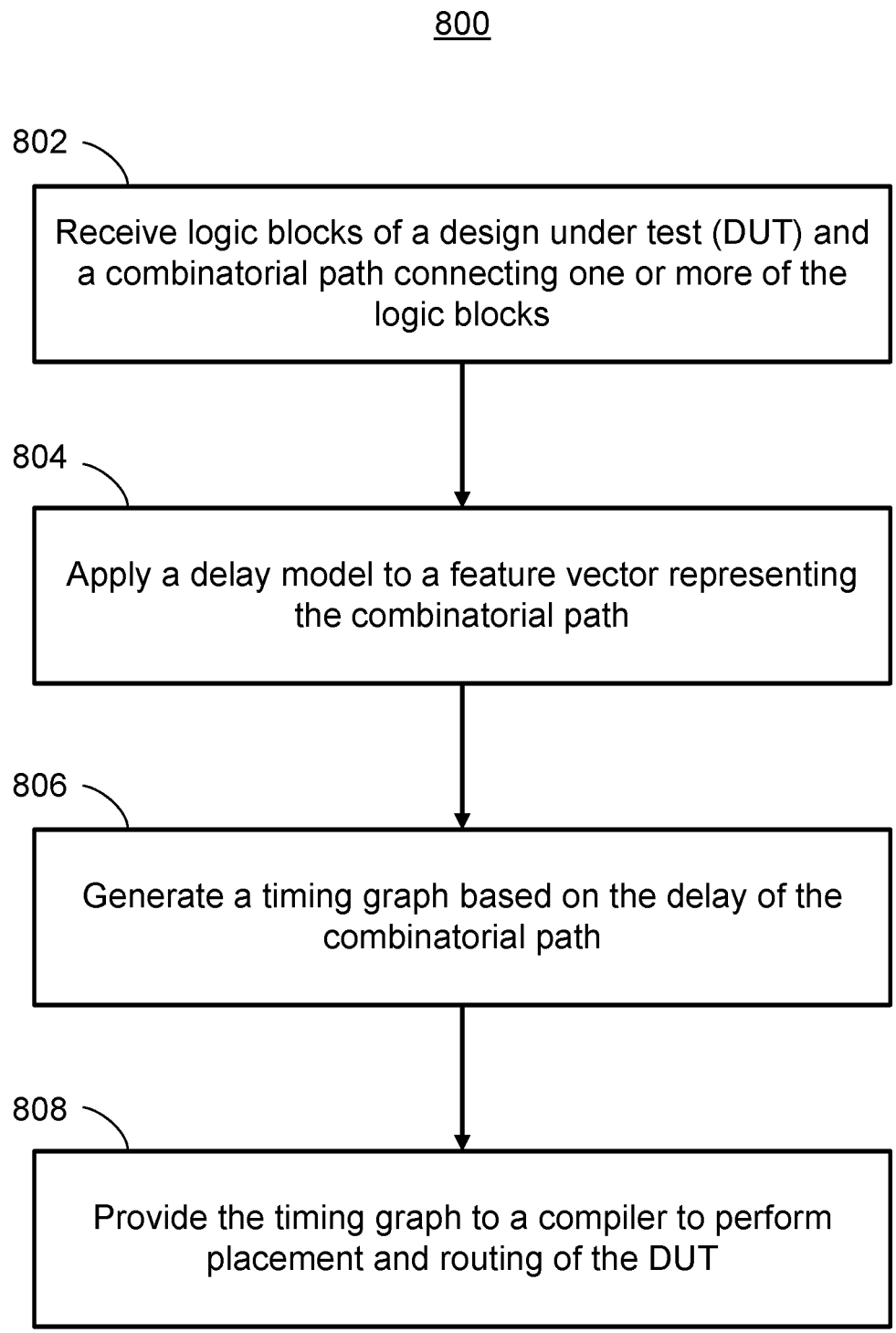
FIG. 8 depicts a flowchart of a process for determining a timing graph for P&R using delay estimates determined by a delay estimation system, according to one embodiment.

FIG. 8 depicts a flowchart of a process 800 for determining a timing graph for P&R using delay estimates determined by a delay estimation system, e.g., 310, according to one embodiment. The process 800 may be performed by the delay estimation system 310. The process 800 may include additional, fewer, or different operations. The delay estimation system 310 receives 802 logic blocks of a DUT and a combinatorial path connecting one or more of the logic blocks. For example, the timing graph generation engine 316 receives 802 a netlist including the logic blocks 221 and 222 of combinatorial path 220 and receives the combinatorial path 220 (e.g., information about the combinatorial path such as its logic length, fanout nature of wires in the combinatorial path, etc.). The delay estimation system 310 applies 804 a delay model to a feature vector representing the combinatorial path. For example, the timing graph generation engine 316 applies 804 the delay model 315 to a feature vector generated by the feature vector generation engine 313. The delay estimation system 310 generates 806 a timing graph based on the delay of the combinatorial path. For example, the timing graph generation engine 316 receives the estimated delay output by the delay model 315, where the estimated delay corresponds to an estimated wire delay of wires within the logic block 221. The timing graph generation engine 316 determines a primitive delay based on the primitives included in the logic block 221 and determines a sum of the primitive delay and the estimated wire delay for the logic block 221. The timing graph generation engine 316 may similarly determine a sum of the primitive and wire delays for the logic block 222. The timing graph generation engine 316 may combine the primitive and wire delays for both logic blocks 221 and 222 and a delay corresponding to the portion of the combinatorial path between pA1 and pB1 to determine the total combinatorial path delay of the combinatorial path 220. The timing graph generation engine 316 generates 806 a timing graph that can include the primitive delays of logic blocks, wiring delays of logic blocks, delays of connections between FPGAs (e.g., between pA1 and pB1), total combinatorial path delays, or any combination thereof. The delay estimation system 310 provides 808 the timing graph to a compiler to perform the placement and routing of the DUT. For example, the timing graph generation engine 316 provides the timing graph including the delays for combinatorial paths 210 and 220 to the compiler 321 to perform P&R of the FPGAs into which the DUT is partitioned. In one example of P&R, the FPGA A-C may be placed and routed in a different configuration from the configuration shown in FIG. 2.

FIG. 9 depicts a diagram of an example emulation environment 900. An emulation environment 900 may be configured to verify the functionality of the circuit design. The emulation environment 900 may include a host system 907 (e.g., a computer that is part of an electronic design automation (EDA) system) and an emulation system 902 (e.g., a set of programmable devices such as Field Programmable Gate Arrays (FPGAs) or processors). The host system generates data and information by using a compiler 910 to structure the emulation system to emulate a circuit design. A circuit design to be emulated is also referred to as a Design Under Test (DUT) where data and information from the emulation are used to verify the functionality of the DUT.

The host system 907 may include one or more processors. In the embodiment where the host system includes multiple processors, the functions described herein as being performed by the host system can be distributed among the multiple processors. The host system 907 may include a compiler 910 to transform specifications written in a description language that represents a DUT and to produce data (e.g., binary data) and information that is used to structure the emulation system 902 to emulate the DUT. The compiler 910 can transform, change, restructure, add new functions to, and/or control the timing of the DUT.

The host system 907 and emulation system 902 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 907 and emulation system 902 can exchange data and information through a third device such as a network server.

The emulation system 902 includes multiple FPGAs (or other modules) such as FPGAs $904_1$ and $904_2$ as well as additional FPGAs to $904_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 902 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $904_1$-$904_N$ may be placed onto one or more boards $912_1$ and $912_2$ as well as additional boards through $912_M$. Multiple boards can be placed into an emulation unit $914_1$. The boards within an emulation unit can be connected using the backplane of the emulation unit or any other types of connections. In addition, multiple emulation units (e.g., $914_1$ and $914_2$ through $914_K$) can be connected to each other by cables or any other means to form a multi-emulation unit system.

For a DUT that is to be emulated, the host system 907 transmits one or more bit files to the emulation system 902. The bit files may specify a description of the DUT and may further specify partitions of the DUT created by the host system 907 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 907 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 907 and/or the compiler 910 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 905 into gate level logic. For a DUT that is to be emulated, the design synthesizer sub-system receives a description of the DUT. If the description of the DUT is fully or partially in HDL (e.g., RTL or other level of representation), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 10:
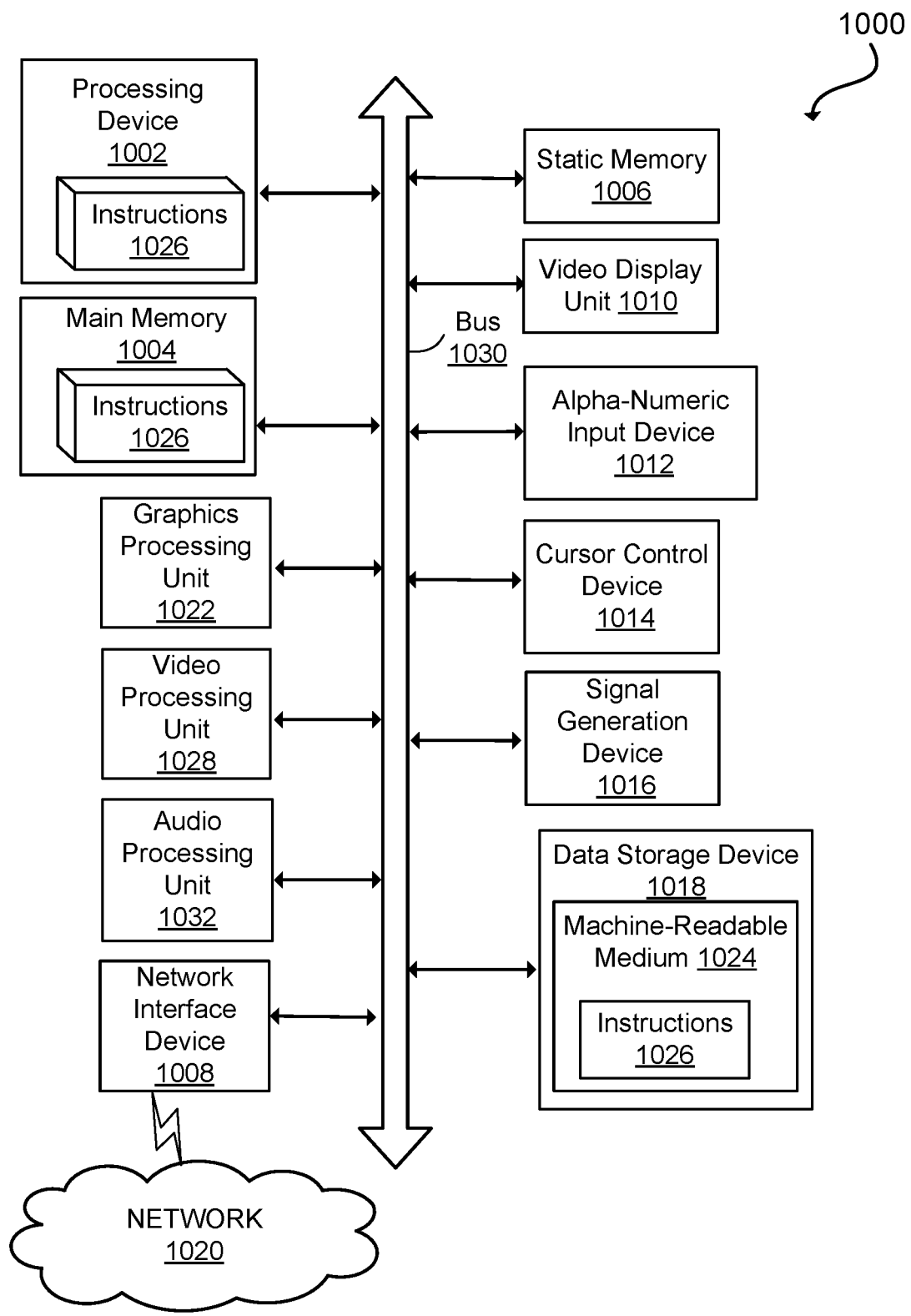
FIG. 10 depicts a diagram of an example computer system in which embodiments of the present disclosure may operate.

FIG. 10 illustrates an example machine of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM), a static memory 1006 (e.g., flash memory, static random access memory (SRAM), etc.), and a data storage device 1018, which communicate with each other via a bus 1030.

Processing device 1002 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may be configured to execute instructions 1026 for performing the operations and steps described herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a non-transitory computer-readable medium) on which is stored one or more sets of instructions 1026 or software embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In some implementations, the instructions 1026 include instructions to implement functionality corresponding to the present disclosure. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1002 to perform any one or more of the methodologies of the present disclosure. The term "machine-readable storage medium" shall accordingly be taken to include, but not be limited to, solid-state memories, optical media, and magnetic media.

ADDITIONAL CONFIGURATION CONSIDERATIONS

Example benefits and advantages of the disclosed configurations include increasing the accuracy with which a delay of a combinational path within a DUT is estimated, increasing the speed at which a DUT is emulated due to compiler partitioning and P&R that are both improved as the accuracy of delays increases (i.e., decreasing the processing cycles needed by an emulator when emulating the compiled the DUT), and decreasing the processing resources consumed to estimate a delay of a combinational path within the DUT. To decrease processing resources needed to determine a combinational path, the delay estimation system described herein uses feature vectors whose dimensions are orthogonal to one another. By using dimensions that avoid redundant information (e.g., data about a combinational path in one feature can be derived from another feature), the delay estimation system increases the accuracy by which the delay is generated (e.g., additional, non-redundant information increases the system's ability to distinguish between different combinational paths and corresponding delays) while simultaneously not wasting processing resources to process redundant information. By providing a more accurate delay estimate at early backend phases of a compilation workflow, the delay estimation system allows a compiler to focus on optimizing true critical paths of a DUT rather than incorrectly flagged critical paths whose delays are not as large as the true critical paths' delays. Thus, the delay estimation system can improve DUT emulation (e.g., optimized critical paths causes the speed of emulation to increase) without manual tuning or additional iterations to adjust internal FPGA delays. Furthermore, reducing the frequency at which reperforming emulation is needed due to initial results being low in accuracy also reduces the processing resources consumed by an emulation system. A higher emulation frequency enables a faster turnaround in the testing process of user designs, allows more coverage, and lowers cost.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A non-transitory computer readable medium comprising stored instructions for delay estimation, wherein the stored instructions, when executed by a processor, cause the processor to:
   receive a plurality of logic blocks of a design under test (DUT);
   identify a combinatorial path based on the DUT, the combinatorial path connecting one or more logic blocks of the plurality of logic blocks;
   generate a feature vector including values of one or more orthogonal features representing characteristics of the combinatorial path;
   apply a pre-trained machine learning delay model to the feature vector to determine a wire delay of the combinatorial path, the pre-trained machine learning delay model trained using (1) values of the one or more orthogonal features representing the characteristics of a plurality of combinatorial paths, and (2) measured wire delays of the plurality of combinatorial paths;
   generate a timing graph based on the wire delay of the combinatorial path; and
   provide the timing graph to a compiler to perform placement and routing of the DUT.

2. The non-transitory computer readable medium of claim 1, wherein the instructions further comprise instructions that, when executed by the processor, cause the processor to:
   generate a first training data set using the plurality of combinatorial paths of compiled DUTs and the plurality of measured delays of the plurality of combinatorial paths; and
   train the delay model using the first training data set.

3. The non-transitory computer readable medium of claim 2, wherein the instructions further comprise instructions that, when executed by the processor, cause the processor to:
   receive a measured delay of the combinatorial path, wherein the measured delay is obtained after the compiler compiles the DUT; and
   retrain the delay model using a second training data set generated using the combinatorial path and the measured delay.

4. The non-transitory computer readable medium of claim 3, wherein the instructions to retrain the delay model using the second training data set further comprise instructions that, when executed by the processor, cause the processor to:
   adjust a plurality of weights corresponding to a plurality of dimensions of the feature vector;
   generate the second training data set using the adjusted plurality of weights, the combinatorial path, and the measured delay; and
   retrain the delay model using the second training data set.

5. The non-transitory computer readable medium of claim 1, wherein the instructions further comprise instructions that, when executed by the processor, cause the processor to:
   generate the feature vector using at least one of a number of logic levels on the combinatorial path, a total hierarchical distance of a plurality of wires on the combinatorial path, a sum of fanouts of the plurality of wires on the combinatorial path, a timing path type of the combinatorial path, a register primitive fill rate of a plurality of field programmable gate arrays (FPGAs) through which the combinatorial path spans, and a look-up-table (LUT) primitive fill rate of the plurality of FPGAs.

6. The non-transitory computer readable medium of claim 1, wherein the combinatorial path is a first combinatorial path spanning a first number of FPGAs, wherein the delay is a first delay, and wherein the instructions further comprise instructions that, when executed by the processor, cause the processor to:
   determine a second delay for a second combinatorial path spanning a second number of FPGAs, wherein the second number of FPGAs is less than the first number of FPGAs; and
   determine, responsive to the second delay being greater than the first delay, that the second combinatorial path is a critical path, wherein the compiler allocates a first time-division multiplexing (TDM) ratio to the first combinatorial path and allocates a second TDM ratio to the second combinatorial path, the second TDM ratio greater than the first TDM ratio.

7. The non-transitory computer readable medium of claim 1, wherein the instructions further comprise instructions that, when executed by the processor, cause the processor to:
   partition a circuit design of the DUT across a plurality of FPGAs; and
   identify the one or more logic blocks connected on the combinatorial path.

8. The non-transitory computer readable medium of claim 7, wherein the timing graph is a first timing graph, wherein the instructions to partition the circuit design comprise instructions to partition the circuit design using a second timing graph generated by the delay model.

9. The non-transitory computer readable medium of claim 1, wherein the instructions to generate the timing graph based on the wire delay of the combinatorial path comprise instructions to:
   determine a primitive delay of the combinatorial path; and
   determine a total combinatorial path delay using the wire delay and the primitive delay, wherein the timing graph comprises a plurality of total combinatorial path delays for a plurality of combinatorial paths connecting the plurality of logic blocks of the DUT.

10. A method for delay estimation, the method comprising:

receiving a plurality of logic blocks of a DUT;
identifying a combinatorial path based on the DUT, the combinatorial path connecting one or more logic blocks of the plurality of logic blocks;
generating a feature vector including values of one or more orthogonal features representing characteristics of the combinatorial path;
applying a pre-trained machine learning delay model to the feature vector to determine a wire delay of the combinatorial path, the pre-trained machine learning delay model trained using (1) values of the one or more orthogonal features representing the characteristics of a plurality of combinatorial paths, and (2) measured wire delays of the plurality of combinatorial paths;
generating, by a processor, a timing graph based on the delay of the combinatorial path; and
providing the timing graph to a compiler for performance of placement and routing of the DUT.

11. The method of claim 10, further comprising:
generating a first training data set using a plurality of combinatorial paths of compiled DUTs and a plurality of measured delays of the plurality of combinatorial paths; and
training the delay model using the first training data set.

12. The method of claim 11, further comprising:
receiving a measured delay of the combinatorial path, wherein the measured delay is obtained after a compiler compiles the DUT; and
retraining the delay model using a second training data set generated using the combinatorial path and the measured delay.

13. The method of claim 12, wherein retraining the delay model using the second training data set comprises:
adjusting a plurality of weights corresponding to a plurality of dimensions of the feature vector;
generating the second training data set using the adjusted plurality of weights, the combinatorial path, and the measured delay; and
retraining the delay model using the second training data set.

14. The method of claim 10, further comprising:
generating the feature vector using at least one of a number of logic levels on the combinatorial path, a total hierarchical distance of a plurality of wires on the combinatorial path, a sum of fanouts of the plurality of wires on the combinatorial path, a timing path type of the combinatorial path, a register primitive fill rate of a plurality of FPGAs through which the combinatorial path spans, and a LUT primitive fill rate of the plurality of FPGAs.

15. The method of claim 10, wherein the combinatorial path is a first combinatorial path spanning a first number of FPGAs, wherein the delay is a first delay, and further comprising:
determining a second delay for a second combinatorial path spanning a second number of FPGAs, wherein the second number of FPGAs is less than the first number of FPGAs; and
determining, responsive to the second delay being greater than the first delay, that the second combinatorial path is a critical path, wherein the compiler allocates a first time-division multiplexing (TDM) ratio to the first combinatorial path and allocates a second TDM ratio to the second combinatorial path, the second TDM ratio greater than the first TDM ratio.

16. A system for delay estimation, the system comprising:
a memory; and
a processor, operatively coupled with the memory, to:
receive a plurality of logic blocks of a DUT;
identify a combinatorial path based on the DUT, the combinatorial path connecting one or more logic blocks of the plurality of logic blocks;
generate a feature vector including values of one or more orthogonal features representing characteristics of the combinatorial path;
apply a pre-trained machine learning delay model to the feature vector to determine a wire delay of the combinatorial path, the pre-trained machine learning delay model trained using (1) values of one or more orthogonal features representing the characteristics of a plurality of combinatorial paths, and (2) measured wire delay of the plurality of combinatorial paths;
generate a timing graph based on a delay of the combinatorial path; and
provide the timing graph to a compiler to perform placement and routing of the DUT.

17. The system of claim 16, wherein the processor is further configured to:
generate a first training data set using a plurality of combinatorial paths of compiled DUTs and a plurality of measured delays of the plurality of combinatorial paths, the plurality of measured delays stored in a database of measured delays; and
train the delay model using the first training data set.

18. The system of claim 17, wherein the processor is further configured to:
receive a measured delay of the combinatorial path, wherein the measured delay is obtained after the compiler compiles the DUT; and
retrain the delay model using a second training data set generated using the combinatorial path and the measured delay.

19. The system of claim 18, wherein the processor is configured to retrain the delay model using the second training data set by:
adjusting a plurality of weights corresponding to a plurality of dimensions of the feature vector;
generating the second training data set using the adjusted plurality of weights, the combinatorial path, and the measured delay; and
retraining the delay model using the second training data set.

20. The system of claim 16, wherein the processor is further configured to:
receive the combinatorial path; and
generate the feature vector using at least one of a number of logic levels on the combinatorial path, a total hierarchical distance of a plurality of wires on the combinatorial path, a sum of fanouts of the plurality of wires on the combinatorial path, a timing path type of the combinatorial path, a register primitive fill rate of a plurality of FPGAs through which the combinatorial path spans, and a LUT primitive fill rate of the plurality of FPGAs.

* * * * *